(12) United States Patent
Nakajima (10) Patent No.: US 9,349,551 B2
(45) Date of Patent: May 24, 2016

(54) KEYBOARD WITH ELASTIC MEMBER DISPOSED ON TOUCH PANEL

(75) Inventor: Takashi Nakajima, Shinagawa (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 210 days.

(21) Appl. No.: 13/596,554

(22) Filed: Aug. 28, 2012

(65) Prior Publication Data

US 2013/0050095 A1 Feb. 28, 2013

(30) Foreign Application Priority Data

Aug. 31, 2011 (JP) ................. 2011-189407

(51) Int. Cl.
 *G06F 3/02* (2006.01)
 *H01H 13/70* (2006.01)
 *H01H 13/703* (2006.01)
 *H01H 13/702* (2006.01)
 *H01H 13/704* (2006.01)
 *G06F 3/045* (2006.01)

(52) U.S. Cl.
 CPC .......... *H01H 13/703* (2013.01); *G06F 3/0202* (2013.01); *G06F 3/045* (2013.01); *H01H 13/702* (2013.01); *H01H 13/704* (2013.01); *G06F 2203/04809* (2013.01); *H01H 2209/004* (2013.01); *H01H 2221/054* (2013.01)

(58) Field of Classification Search
 CPC ............ G06G 2203/04809; G06G 2200/1634; H01H 13/702; H01H 13/704; H01H 2209/009; H01H 2221/004; H01H 2221/054; H01H 2221/076; H01H 2209/004; H01H 13/703

USPC ................. 400/714, 473, 491, 472
 See application file for complete search history.

(56) References Cited

U.S. PATENT DOCUMENTS

| | | | | |
|---|---|---|---|---|
| 4,527,021 A | * | 7/1985 | Morikawa et al. | ............ 200/5 A |
| 5,010,213 A | * | 4/1991 | Moriwaki et al. | ......... 178/18.05 |
| 5,518,078 A | * | 5/1996 | Tsujioka et al. | ........... 178/18.05 |
| 6,259,044 B1 | * | 7/2001 | Paratore et al. | ............... 200/5 A |
| 8,094,806 B2 | * | 1/2012 | Levy | ............................. 379/368 |
| 2010/0315343 A1 | | 12/2010 | Lau | |

FOREIGN PATENT DOCUMENTS

| | | | | |
|---|---|---|---|---|
| JP | 58-010335 U | | 7/1981 | |
| JP | 06161660 A | * | 6/1994 | ............. G06F 3/033 |
| JP | 09-17278 A | | 1/1997 | |
| JP | 09017278 A | * | 1/1997 | ............ H01H 13/70 |

(Continued)

OTHER PUBLICATIONS

Notification of Reasons for Refusal for Application No. 2001-189407 dated Apr. 14, 2015.

*Primary Examiner* — Daniel J Colilla
(74) *Attorney, Agent, or Firm* — Staas & Halsey LLP (57) ABSTRACT

A keyboard including a touch panel having an input operation surface; and an elastic plate-like member disposed and superimposed on the input operation surface of the touch panel. The elastic plate-like member is locally and elastically deformable by a pressing force. The elastic plate-like member includes an input region adapted to be elastically deformed toward the input operation surface by the pressing force so as to permit input operation of the touch panel, and a non-input region not permitting input operation of the touch panel irrespective of presence or absence of elastic deformation by the pressing force.

12 Claims, 8 Drawing Sheets

(56) References Cited

FOREIGN PATENT DOCUMENTS

| | | | | | |
|---|---|---|---|---|---|
| JP | 09044304 A | * | 2/1997 | ............... | G06F 3/033 |
| JP | 09292943 A | * | 11/1997 | ................ | G06F 3/03 |
| JP | 09-325859 A | | 12/1997 | | |
| JP | 2004-134309 A | | 4/2004 | | |
| JP | 2008-77850 A | | 4/2008 | | |
| JP | 2009-193859 A | | 8/2009 | | |
| JP | 2010-61425 | | 3/2010 | | |
| JP | 2011-100259 | | 5/2011 | | |
| JP | 3169346 U | | 7/2011 | | |

* cited by examiner

KEYBOARD WITH ELASTIC MEMBER DISPOSED ON TOUCH PANEL

CROSS-REFERENCE TO RELATED APPLICATIONS

This application is based upon and claims the benefit of priority of the prior Japanese Application No. 2011-189407, filed Aug. 31, 2011, the entire contents of which are incorporated herein by reference.

BACKGROUND OF THE INVENTION

1. Field of the Invention

The present invention relates to a keyboard.

2. Description of the Related Art

A flat input keyboard has been known as a keyless keyboard used as an input device for an electronic apparatus such as a personal computer, which enables a key entry operation to be carried out by the function of a touch panel for designating two-dimensional coordinate data, instead of a mechanical key switch using, e.g., a membrane switch (see, e.g., Japanese Unexamined Patent Publication (Kokai) No. 2011-100259 (JP2011-100259A). A touch panel is a panel-type input device (or a coordinate detection device) that can designate two-dimensional coordinate data corresponding to a desired point on a panel surface, to which an operator presses or contacts a pen or a finger.

Generally, irrespective of the types of detecting coordinate data, such as a resistive type, capacitive type, etc., a touch panel has a flat outer surface of an outermost plate-like member (a glass plate, a plastic plate, or a plastic film, etc.) of a panel structure, which serves as an input operation surface adapted to be operated by a pen or a finger. Since the input operation surface is the outer surface of a plate-like member and a touch panel generally has no flexibility in its entirety, a relatively stiff feeling is given on, e.g., the finger from the input operation surface at the time of an input operation. For example, Japanese Unexamined Patent Publication (Kokai) No. 2010-061425 (JP2010-061425A) describes a capacitive-type touch panel provided with an outermost layer having elasticity and made of, e.g., silicone resin, in which, when a user presses the touch panel, the elastic outermost layer is deformed and dented, so as to improve an operational feeling.

SUMMARY OF THE INVENTION

In a flat input keyboard including a touch panel, it is desired to ensure keying operation characteristics that enable an operator to realize and recognize a key entry operation by an operational feeling on a finger, such as a keying stroke or a click feeling in a characteristic key entry operation of a mechanical key switch.

One aspect of the present invention provides a keyboard comprising a touch panel having an input operation surface; and an elastic plate-like member disposed and superimposed on the input operation surface of the touch panel, the elastic plate-like member being locally and elastically deformable by a pressing force; wherein the elastic plate-like member includes an input region adapted to be elastically deformed toward the input operation surface by the pressing force so as to permit input operation of the touch panel, and a non-input region not permitting input operation of the touch panel irrespective of presence or absence of elastic deformation by the pressing force.

In the above keyboard, the input region may have a thickness less than a thickness of the non-input region, and the elastic plate-like member may include a recess formed on an inner surface facing the input operation surface of the touch panel, the recess being provided to the input region due to a difference in thickness between the input region and the non-input region.

In the above keyboard, the input region may have a thickness greater than a thickness of the non-input region, and the elastic plate-like member may include a protrusion formed on an outer surface not facing the input operation surface of the touch panel, the protrusion being provided to the input region due to a difference in thickness between the input region and the non-input region.

In the above keyboard, the elastic plate-like member may include a recess formed on an inner surface facing the input operation surface of the touch panel and provided to the input region, and a protrusion formed on an outer surface opposite to the inner surface and provided to the input region correspondingly to the recess.

In the above keyboard, the input region and the non-input region may comprise mutually different material properties.

In the above keyboard, the touch panel may comprise a pair of electrode plates each including a substrate and a conductive coating provided on a surface of the substrate, the pair of electrode plates being combined with each other in a relative arrangement such that conductive coatings are opposed to and spaced from each other while permitting a conductive contact between the conductive coatings, and a plurality of dot spacers arranged in a dispersed manner between mutually opposing conductive coatings of the pair of electrode plates. In this configuration, a density of the dot spacers in a region corresponding to the input region of the elastic plate-like member may be lower than a density of the dot spacers in a region corresponding to the non-input region of the elastic plate-like member.

In the above keyboard, the touch panel may comprise a pair of electrode plates each including a substrate and a conductive coating provided on a surface of the substrate, the pair of electrode plates being combined with each other in a relative arrangement such that conductive coatings are opposed to and spaced from each other while permitting a conductive contact between the conductive coatings. In this configuration, the keyboard may further comprise a signal processing section adapted to cancel an input signal of the touch panel in a region corresponding to the non-input region of the elastic plate-like member.

In the above keyboard, the touch panel may comprise a single conductive coating or a pair of conductive coatings arranged to be opposed to and insulated from each other. In this configuration, the keyboard may further comprise a signal processing section adapted to cancel an input signal of the touch panel in a region corresponding to the non-input region of the elastic plate-like member.

In the above keyboard, the input region of the elastic plate-like member may be provided with an auxiliary conductive coating insulated from the conductive coatings of the touch panel.

According to the above keyboard, an operator can indirectly perform an input operation to a desired position on the input operation surface of the touch panel via the input region of the elastic plate-like member. Therefore, due to the elastic deformation amount and/or elastic reaction force of the input region and a region adjacent thereto of the elastic plate-like member, it is possible to ensure keying operation characteristics that enable an operator to realize and recognize a key entry operation by an operational feeling on a finger, such as a keying stroke or a click feeling obtained in a characteristic key entry operation of a mechanical key switch. Since a keying operation is not performed directly on the input operation surface of the touch panel but on the outer surface of the elastic plate-like member, it is possible to reduce noise associated with the keying operation and also mitigate impact on and/or fatigue of a finger of the operator.

BRIEF DESCRIPTION OF THE DRAWINGS

The above and other objects, features and advantages of the present invention will become more apparent from the following description of the embodiments in connection with the accompanying drawings, wherein.

DESCRIPTION OF THE EMBODIMENT

The embodiments of the present invention are described below, in detail, with reference to the accompanying drawings. In the drawings, the same or similar components are denoted by common reference numerals.

Figure 1:
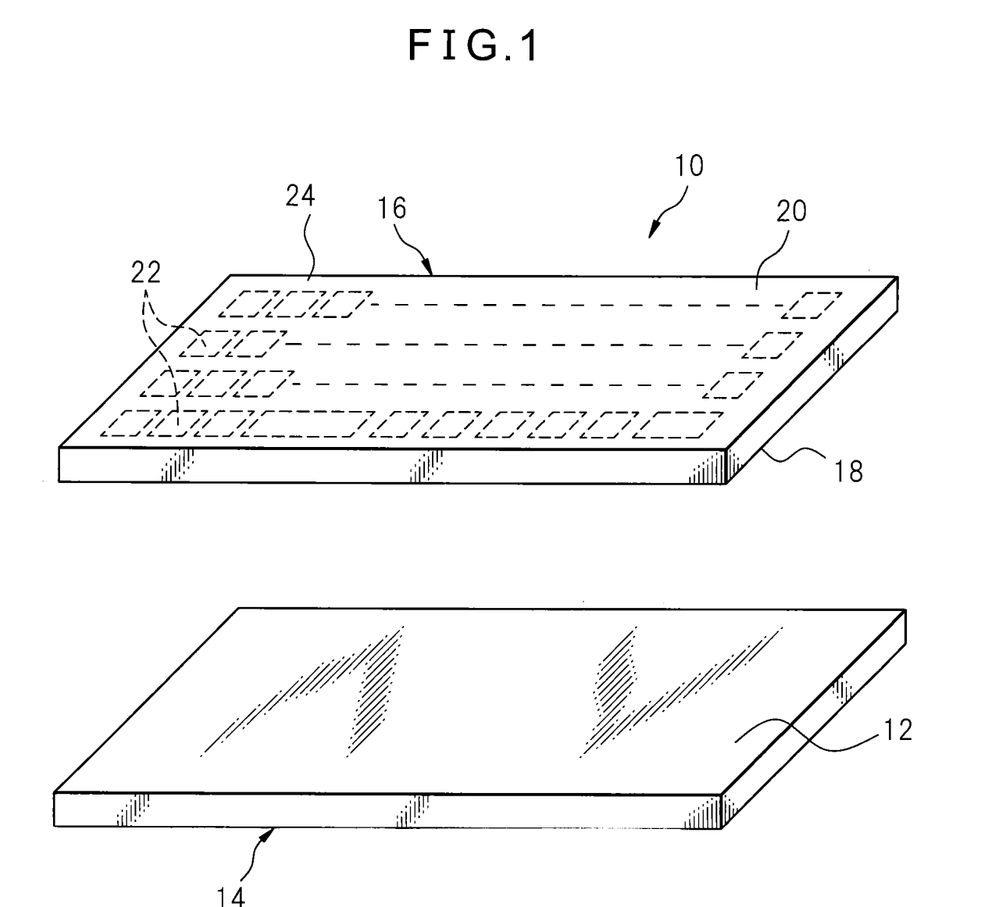
FIG. 1 is an exploded perspective view schematically depicting a flat input keyboard according to an embodiment of the present invention.

Referring to the drawings, FIG. 1 schematically depicts a flat input keyboard 10 according to one embodiment of a keyboard. The flat input keyboard 10 includes a touch panel 14 having an input operation surface 12, and an elastic plate-like member 16 disposed and superimposed on the input operation surface 12 of the touch panel 14, the elastic plate-like member 16 being locally and elastically deformable by a pressing force applied thereon.

The touch panel 14 is a known panel-type input device (or a coordinate detection device) that detects a two-dimensional coordinate value of an input position on the input operation surface 12, by various types of methods for detecting an input coordinate value, such as a resistive type, a capacitive type, etc. The input operation surface 12 is formed by a flat outer surface of an outermost plate-like member (a glass plate, a plastic plate, or a plastic film, etc.) of the touch panel 14. The touch panel 14 may have a transparent structure that can be placed on top of the screen of a display unit such as an LCD (not depicted), or an opaque structure adapted to be used separately of the display unit. The configuration of the touch panel 14, such as the coordinate detection type, is not particularly limited.

The elastic plate-like member 16 is a flat platy member capable of being placed on the input operation surface 12 so as to preferably entirely cover the input operation surface 12 of the touch panel 14, and includes an inner surface 18 facing the input operation surface 12 and an outer surface (i.e., an exposed surface) 20 opposite to the inner surface 18 and not facing the input operation surface 12. The elastic plate-like member 16 is provided with an input region 22 adapted to be elastically deformed toward the input operation surface 12 by a pressing force so as to permit an input operation to be carried out in the touch panel 14, and a non-input region 24 not permitting an input operation to be carried out in the touch panel 14 irrespective of the presence or absence of the elastic deformation thereof by the pressing force.

The elastic plate-like member 16 is made of a material such as silicone, polyurethane, etc., which can be elastically deformed locally (i.e., in a limited region including a pressed point and a portion adjacent thereto) by an appropriate pressing force applied to a desired point on the outer surface 20. The material, shape and size of the elastic plate-like member 16 are selected so as to satisfy a requirement that at least the input region 22 can be elastically deformed, due to a pressing force in a predetermined range, to the extent sufficient to carry out the input operation of the touch panel 14. The range of the pressing force required to elastically deform at least the input region 22 of the elastic plate-like member 16 to the extent sufficient to carry out the input operation of the touch panel 14 may be set so as to correspond to the range of a force required to depress a mechanical key switch by a key entry operation generally set in a keyboard having the mechanical key switch.

The elastic plate-like member 16 may be transparent, or translucent or opaque. The elastic plate-like member 16 may be bonded to the touch panel 14 with a suitable adhesive. Alternatively, the elastic plate-like member 16 may be formed from a self-adhesive material, so as to eliminate the use of an adhesive. The configuration of the elastic plate-like member 16, such as the material, shape, size, etc., is not particularly limited, except for the requirements described above.

In the flat input keyboard 10, the input region 22 of the elastic plate-like member 16 constitutes a key to be subjected to a key entry operation by an operator. FIG. 1 illustrates a plurality of input regions 22 (i.e., regions enclosed by dashed lines) provided in accordance with a specific key arrangement standardized by, e.g., JIS, and a non-input region 24 surrounding the input regions 22. Characters, numbers, symbols, etc. (not depicted), can be indicated in the input regions 22 by, e.g., a screen display on a display unit (not depicted) provided on a side opposite to the input operation surface 12 of the touch panel 14 facing the elastic plate-shaped member 16, a print display on the input operation surface 12 of the touch panel 14, a print display on the elastic plate-like member 16, an insertion of a printed sheet (not depicted), etc.

In the flat input keyboard 10, an operator can perform a keying operation to press a desired input region 22 of the elastic plate-like member 16 while referring to a key display indicated on the input region 22. The input region 22 elastically deforms in response to the keying operation by the operator and, when the pressing force of the keying operation exceeds a predetermined threshold value, accomplishes an input operation on the input operation surface 12 of the touch panel 14 at the position corresponding to the pressed or deformed input region 22. Thus, the operator indirectly performs the input operation at a desired key-entry point on the input operation surface 12 of the touch panel 14 via the input region 22 of the elastic plate-like member 16. Therefore, according to the flat input keyboard 10, due to the elastic deformation amount and/or elastic reaction force of the input region 22 and a region adjacent thereto of the elastic plate-like member 16, it is possible to ensure keying operation characteristics that enable an operator to realize and recognize a key entry operation by an operational feeling on a finger, such as a keying stroke or a click feeling obtained in a characteristic key entry operation of a mechanical key switch. Since a keying operation is not performed directly on the input operation surface 12 of the touch panel 14 but on the outer surface 20 of the elastic plate-like member 16, it is possible to reduce noise associated with the keying operation, and also mitigate impact on and/or fatigue of a finger of the operator. Further, since the keyboard 10 is configured simply by arranging a single piece of the elastic plate-like member 16 on the input operation surface 12 of the touch panel 14, the equipment configuration is simplified compared to a keyboard including a plurality of discrete or separated mechanical key switches.

The input region 22 and non-input region 24 can be provided by various means in the elastic plate-like member 16. Referring to FIGS. 2A-11, various embodiments of keyboards will be described below, each including an elastic plate-like member provided with an input region and a non-input region formed by various means. The embodiments depicted in FIGS. 2A-11 have substantially the same configuration as the embodiment depicted in FIG. 1, except for the specific configuration of means for forming the input region and the non-input region in the elastic plate like member, and for the specific configuration of the touch panel.

A flat input keyboard 30 depicted in each of FIGS. 2A-7 includes a resistive-type touch panel 34 having an input operation surface 32, and an elastic plate-like member 36 disposed and superimposed on the input operation surface 32 of the touch panel 34, the elastic plate-like member 36 being locally and elastically deformable by a pressing force applied thereto.

The resistive-type touch panel 34 includes a first electrode plate 42 including an electrically insulating substrate 38 and an electrically conductive coat or coating 40 provided on a surface of the substrate 38, and a second electrode plate 48 including an electrically insulating substrate 44 and an electrically conductive coating or coating 46 provided on a surface of the substrate 44, the first and second electrode plates 42, 48 being combined with each other in a relative arrangement such that conductive coatings 40, 46 are opposed to and spaced from each other while permitting a conductive contact between the conductive coatings 40, 46. A plurality of electrically insulating dot spacers 50 are arranged in a suitably dispersed manner between the mutually opposing conductive coatings 40, 46 of the first and second electrode plates 42, 48. In the illustrated configuration, the second electrode plate 48 is disposed at an input side, and the rear surface of the substrate 44, opposite to the conductive coating 46, constitutes an input operation surface 32. The substrate 38 of the first electrode plate 42 at a support side may be made of, for example, a glass plate, a plastic plate, or a plastic film, etc., and the substrate 44 of the second electrode plate 48 at the input side may be made of, for example, a plastic plate, a plastic film, etc.

Figure 2A:
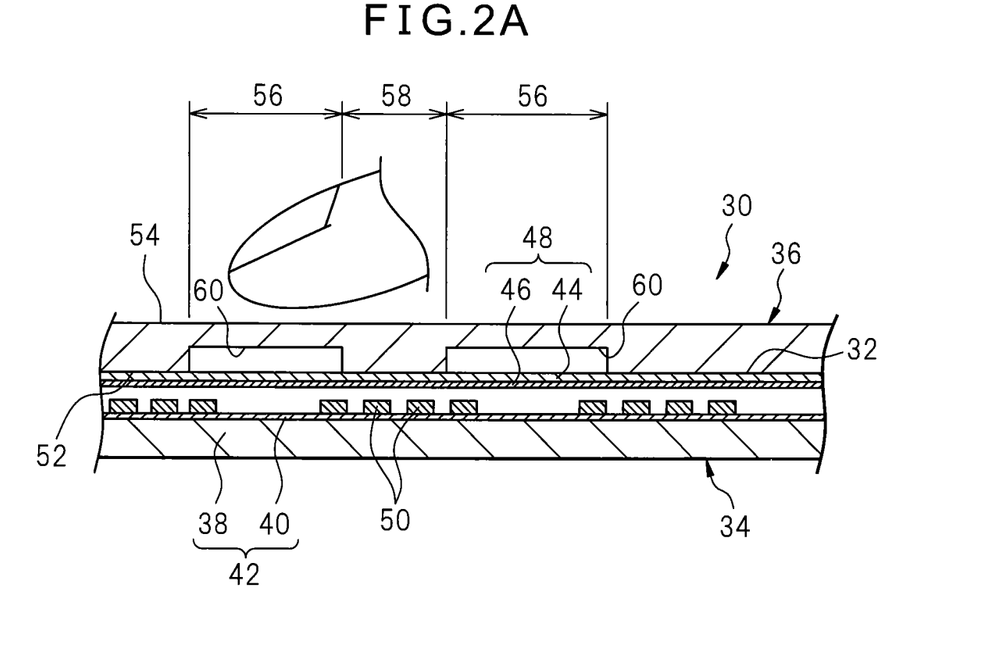
FIG. 2A is a cross-sectional view schematically and diagrammatically depicting a flat input keyboard according to another embodiment of the present invention, in a state before being subjected to an input operation.
Figure 2B:
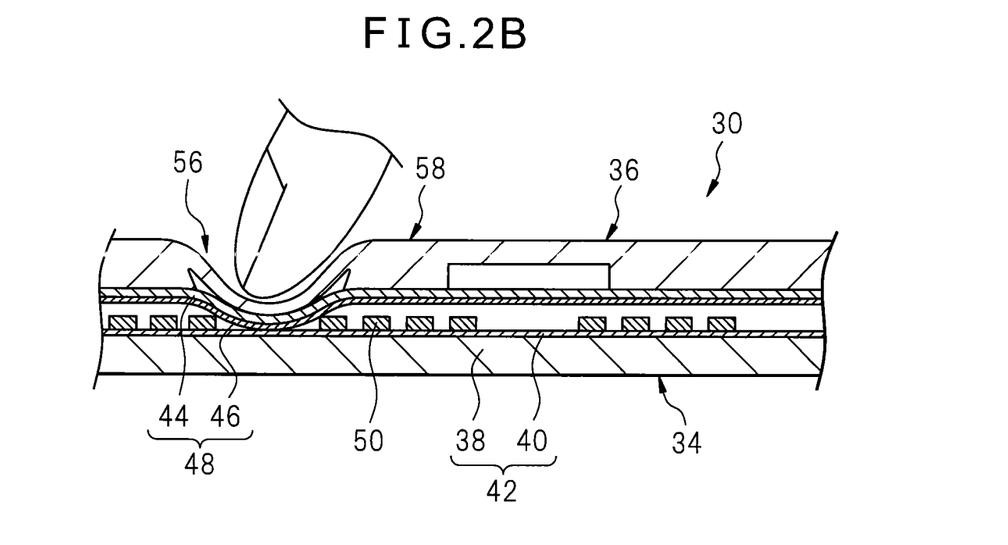
FIG. 2B is a cross-sectional view schematically and diagrammatically depicting the flat input keyboard of FIG. 2A, in a state during the input operation.

Each of the first and second electrode plates 42, 48 is provided, in an area extending along the outer periphery thereof, with a pair of strip-shaped positive and negative electrodes (i.e., a parallel electrode pair) formed in parallel to and spaced from each other on each conductive coating 40, 46, and electric conductors connected to the parallel electrode pair and formed on an insulating layer (not depicted) on each conductive coating 40, 46. To the respective conductive coatings 40, 46 of the electrode plates 42, 48, a predetermined electric voltage is alternately applied via the associated conductors and parallel electrode pairs in directions perpendicular to each other. In this state, when an operator presses a desired point on the input operation surface 32 (i.e., when the operator performs a touch input) so as to bring the conductive coatings 40, 46 locally into conductive contact with each other, a divided voltage corresponding to a resistance value of each conductive coating 40, 46 is determined at the pressed point, and a two-dimensional coordinate value of the pressed point is thereby detected. The above-described method for detecting an input coordinate value has been known as an analog method. In this connection, a resistive-type touch panel executing a digital-type detecting method, in which the conductive coating of each electrode plate is divided into a plurality of strip portions on the surface of the substrate, may also be used as the touch panel 34. The configuration of a resistive-type touch panel is known, and thus is not further explained in detail.

The elastic plate-like member 36 is a flat platy member similar to the elastic plate-like member 16 depicted in FIG. 1, and includes an inner surface 52 facing the input operation surface 32 of the touch panel 34 and an outer surface (i.e., an exposed surface) 54 opposite to the inner surface 52 and not facing the input operation surface 32. The elastic plate-like member 36 is provided with a plurality of input regions 56 and a non-input region 58, corresponding respectively to the input regions 22 and the non-input region 24 depicted in FIG. 1.

In the embodiment depicted in FIGS. 2A-2B, the input regions 56 and the non-input region 58 are provided in the elastic plate-like member 36 as portions having mutually different shapes adapted to exhibit different elastic deformations by an equal pressing force. More specifically, each of the input regions 56 has a thickness less than a thickness of the non-input region 58, and the elastic plate-like member 36 includes a recess 60 formed on the inner surface 52 and provided to each input region 56 due to a difference in thickness between the input region 56 and the non-input region 58.

In the flat input keyboard 30 of FIGS. 2A-2B, an operator can perform a keying operation to press a desired input region 56 of the elastic plate-like member 36 while referring to a key display (not depicted), such as a character, a number, a symbol, etc., indicated on the input region 56 (FIG. 2A). The key display on each input region 56 can be indicated by, e.g., a screen display on a display unit (not depicted) provided on a side opposite to the input operation surface 32 of the touch panel 34 facing the elastic plate-like member 36, a print display on the input operation surface 32 of the touch panel 34, a print display on the elastic plate-like member 36, an insertion of a printed sheet (not depicted), and so on.

The input region 56 elastically deforms in response to the keying operation by the operator and, when the pressing force of the keying operation exceeds a predetermined threshold value, accomplishes an input operation on the input operation surface 32 of the touch panel 34 at a position corresponding to the pressed or deformed input region 56. The second electrode plate 48 of the resistive-type touch panel 34 is locally bent by the pressing force applied to the input operation surface 32 via the input region 56 of the elastic plate-like member 36, and thereby the conductive coating 46 of the second electrode plate 48 comes into local contact with the conductive coating 40 of the first electrode plate 42 (FIG. 2B). A signal processing section (not depicted) of the touch panel 34 detects a mutual contact of the conductive coatings 40, 46 due to the keying operation by the operator, specifies a two-dimensional coordinate value of the position of the contact point by the aforementioned method, and thereby identifies the key (i.e., the input region 56) subjected to the input operation.

According to the flat input keyboard 30 of FIGS. 2A-2B, due to the elastic deformation amount and/or elastic reaction force of the input region 56 and a region adjacent thereto of the elastic plate-like member 36, it is possible to ensure keying operation characteristics that enable an operator to realize and recognize a key entry operation by an operational feeling on a finger. In this connection, in the configuration depicted in FIGS. 2A-2B, since the input region 56 is thinner than the non-input region 58 and the recess 60 is formed in the input region 56 on the inner surface 52 of the elastic plate-like member 36, the input region 56 is elastically deformed more easily than the non-input region 58 under an equal pressing force. Therefore, the input region 56 permitting the input operation of the touch panel 34 and the non-input region 58 not permitting the input operation of the touch panel 34 can be formed by suitably selecting the size (in particular, the thickness) and the material of the elastic plate-like member 36 in such a manner that the range of the pressing force required to elastically deform the elastic plate-like member 36 to the extent sufficient to carry out the input operation of the touch panel 34 is, in the input region 56, comparable to the range of a pressing force required to a key entry operation generally set in a keyboard having a mechanical key switch (the pressing force in this range is hereinafter referred to as a normal pressing force), while in the non-input region 58, exceeds the normal pressing force (the pressing force in this range is hereinafter referred to as an excessive pressing force).

In the configuration of FIGS. 2A-2B, an operating stroke defined from a state where an operator brings his finger into contact with the outer surface 54 of the elastic plate-like member 36 to a state where the operator presses to deform the input region 56 so as to complete the input operation, can be appropriately set by suitably selecting the difference in thickness between the input region 56 and the non-input region 58 (i.e., the depth of the recess 60). The recess 60 may be formed in a mold during a molding process of the elastic plate-like member 36 in a case where the elastic plate-like member 36 has a unitary or one-piece structure, or alternatively may be formed when sheet materials of the elastic plate-like member 36 are stacked on each other in a case where the elastic plate-like member 36 has a laminated structure of the sheet materials. Since, in the configuration of FIGS. 2A-2B, the input region 56 of the elastic plate-like member 36 is elastically deformed more easily as compared to the non-input region 58, an operator can judge whether or not the input region 56 is accurately pressed or keyed, based on the operational feeling sensed at the tip of his finger.

The flat input keyboard 30 of FIGS. 2A-2B may have a configuration wherein the dot spacers 50 of the touch panel 34 are arranged in such a manner that a density of the dot spacers 50 in a region corresponding to the input region 56 is lower than a density of the dot spacers 50 in a region corresponding to the non-input region 58. As illustrated, substantially no dot spacer 50 may be arranged in the region corresponding to the input region 56. According to the above configuration, it is possible to effectively prevent the touch panel 34 from being subjected to an input operation at the non-input region 58 even when a pressing force is applied to the non-input region 58. Further, when a marginal part of the high-density dot spacers 50 arranged in the region corresponding to the non-input region 58 partially extends into the input region 56 as depicted, the input region 56 can exhibit a constant elastic deformation, and thus a variation in the operational feeling can be suppressed. If the elastic plate-like member 36 has a characteristic configuration that alone can clearly distinguish the input region 56 from the non-input region 58 by the operation characteristics and also can adequately prevent an erroneous input in the non-input region 58, the dot spacers 50 may be arranged in a uniform density across the touch panel 34.

In the flat input keyboard 30 of FIGS. 2A-2B, the input region 56 and the non-input region 58 may have mutually different material properties (density, material, etc.). For example, the input region 56 and the non-input region 58 may be formed by molding the elastic plate-like member 36 through a two-color molding process, so as to provide the non-input region 58 with material properties more difficult to be elastically deformed than the input region 56.

In the flat input keyboard 30 of FIGS. 2A-2B, if an air is encapsulated in an air-tight manner in the recess 60 formed on the side of the inner surface 52 of the elastic plate-like member 36, the keying operation characteristics of the input region 56 may be affected by an air spring due to the encapsulated air. From this viewpoint, a passage (not depicted) allowing air to flow between the recess 60 and the exterior of the keyboard 30 may be formed at a required position on the inner surface 52 of the elastic plate-like member 36.

Figure 3:
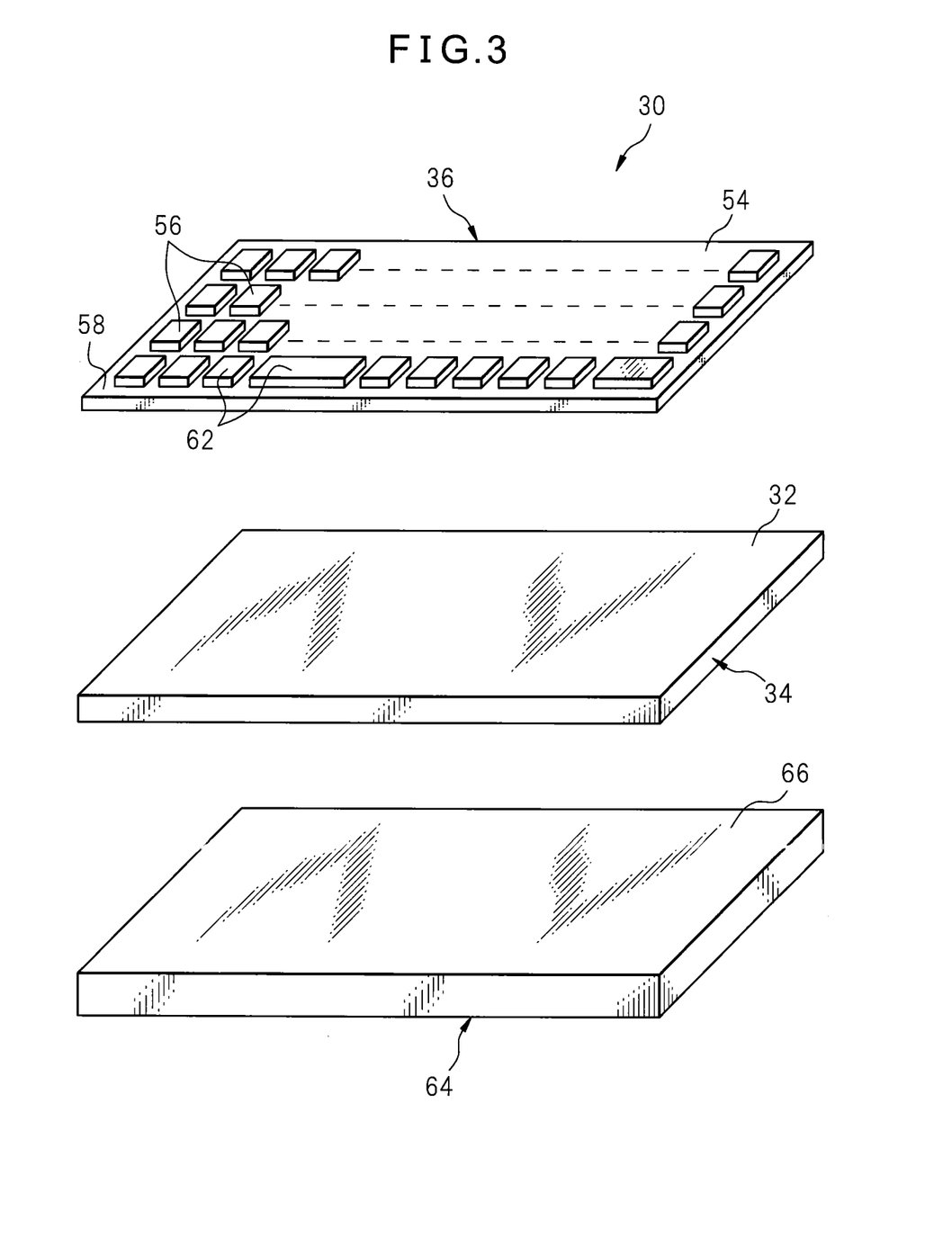
FIG. 3 is an exploded perspective view schematically depicting a flat input keyboard according to still another embodiment of the present invention.
Figure 4:
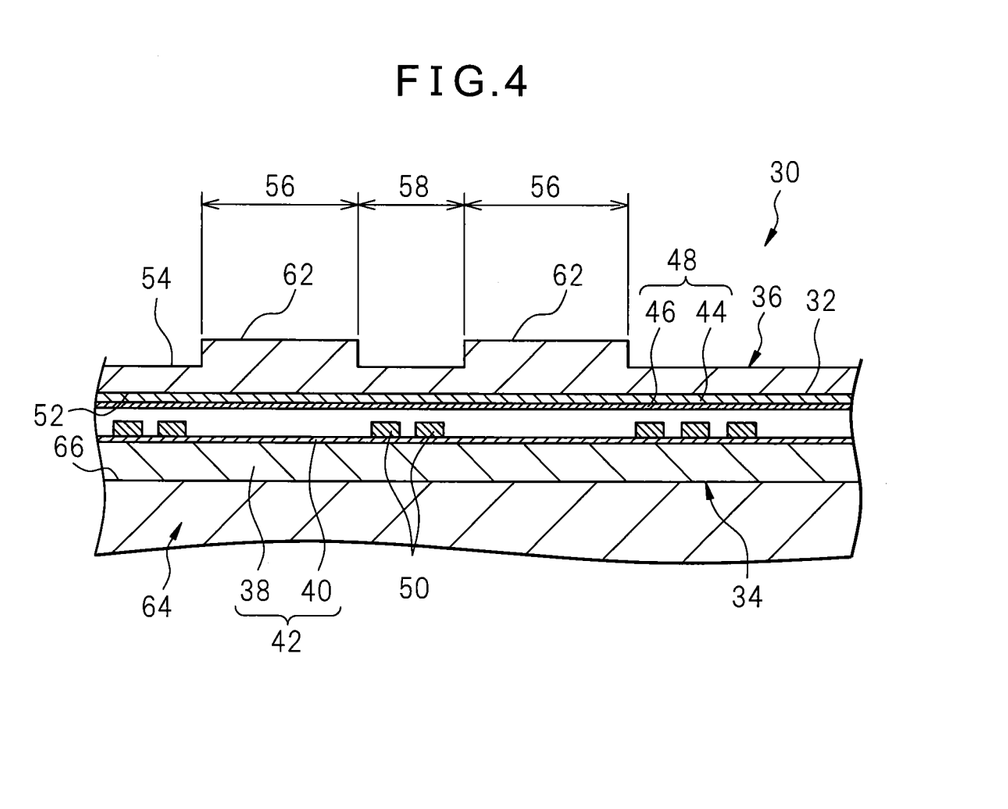
FIG. 4 is a cross-sectional view schematically and diagrammatically depicting the flat input keyboard of FIG. 3.

In the embodiment depicted in FIGS. 3 and 4 (i.e., a modification of the flat input keyboard 30 of FIGS. 2A-2B), the input regions 56 and the non-input region 58 are provided in the elastic plate-like member 36 as portions having mutually different shapes adapted to exhibit different elastic deformations by an equal pressing force. More specifically, each of the input regions 56 has a thickness greater than a thickness of the non-input region 58, and the elastic plate-like member 36 includes a protrusion 62 formed on the outer surface 54 and provided to each input region 56 due to a difference in thickness between the input region 56 and the non-input region 58.

The flat input keyboard 30 of FIGS. 3 and 4 includes a display unit 64, such as an LCD, provided on a side opposite to the input operation surface 32 of the touch panel 34 facing the elastic plate-like member 36. The touch panel 34 and the elastic plate-like member 36 have optical transparency allowing a screen 66 of the display unit 64 to be visually recognized from the side of the outer surface 54 of the elastic plate-like member 36. Thus, an operator can perform a keying operation to press a desired input region 56 of the elastic plate-like member 36 while referring to a key display shown on the screen 66 of the display unit 64, which can be visually recognized in the input region 56 of the elastic plate-like member 36. The input region 56 elastically deforms in response to the keying operation by the operator and, when the pressing force of the keying operation exceeds a predetermined threshold value, accomplishes an input operation on the input operation surface 32 of the touch panel 34 at a position corresponding to the pressed or deformed input region 56. The second electrode plate 48 of the resistive-type touch panel 34 is locally bent by the pressing force applied to the input operation surface 32 via the input region 56 of the elastic plate-like member 36, and thereby the conductive coating 46 of the second electrode plate 48 comes into local contact with the conductive coating 40 of the first electrode plate 42. A signal processing section of the touch panel 34 detects a mutual contact of the conductive coatings 40, 46 due to the keying operation by the operator, specifies a two-dimensional coordinate value of the position of the contact point by the aforementioned method, and thereby identifies the key subjected to the input operation.

According to the flat input keyboard 30 of FIGS. 3 and 4, due to the elastic deformation amount and/or elastic reaction force of the input region 56 and a region adjacent thereto of the elastic plate-like member 36, it is possible to ensure keying operation characteristics that enable an operator to realize and recognize a key entry operation by an operational feeling on a finger. In this connection, in the configuration depicted in FIGS. 3 and 4, since the input region 56 is thicker than the non-input region 58, the input region 56 is more difficult to be elastically deformed than the non-input region 58 under an equal pressing force. On the other hand, since the protrusion 62 is formed in the input region 56 on the outer surface 54 of the elastic plate-like member 36, the input region 56 can be more easily recognized in visual and tactile sense as the presence of the protrusion 62 on the outer surface 54. When the keyboard 30 of FIGS. 3 and 4 is configured in accordance with a key arrangement for a conventional keyboard, the non-input region 58 formed between adjacent input regions 56 has relatively small area as compared to the input region 56, so that an operator can accurately perform a keying operation to the input region 56.

The flat input keyboard 30 of FIGS. 3 and 4 may have a configuration wherein the dot spacers 50 of the touch panel 34 are arranged in such a manner that a density of the dot spacers 50 in a region corresponding to the input region 56 is lower than a density of the dot spacers 50 in a region corresponding to the non-input region 58, so that it is possible to effectively prevent the touch panel 34 from being subjected to an input operation at the non-input region 58 even when a pressing force is applied to the non-input region 58. In this manner, it is possible to provide the input region 56 permitting the input operation of the touch panel 34 and the non-input region 58 not permitting the input operation of the touch panel 34. Alternatively, the input region 56 and the non-input region 58 may have mutually different material properties (density, material, etc.). For example, the input region 56 and the non-input region 58 may be formed by molding the elastic plate like member 36 through a two-color molding process, so as to provide the non-input region 58 with material properties more difficult to be elastically deformed than the input region 56.

In the configuration of FIGS. 3 and 4, an operating stroke defined from a state where an operator brings his finger into contact with the outer surface 54 of the elastic plate-like member 36 (i.e., a top surface of the protrusion 62) to a state where the operator presses to deform the input region 56 so as to complete the input operation, can be appropriately set by suitably selecting the difference in thickness between the input region 56 and the non-input region 58 (i.e., the height of the protrusion 62). The protrusion 62 may be formed in a mold during a molding process of the elastic plate-like member 36 in a case where the elastic plate-like member 36 has a unitary or one-piece structure, or alternatively may be formed when sheet materials of the elastic plate-like member 36 are stacked on each other in a case where the elastic plate-like member 36 has a laminated structure of the sheet materials.

Figure 5:
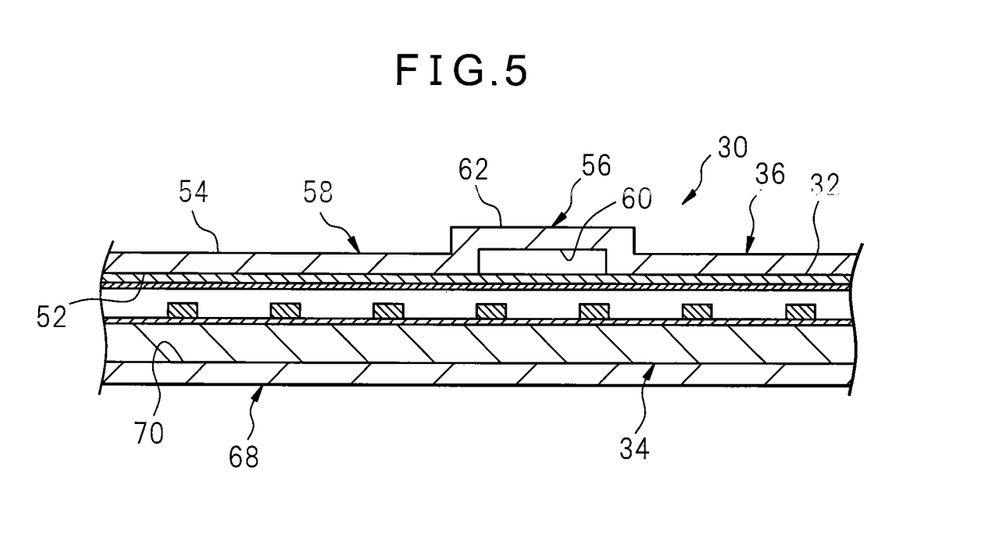
FIG. 5 is a cross-sectional view schematically and diagrammatically depicting a flat input keyboard according to a further embodiment of the present invention.

In the embodiment depicted in FIG. 5 (i.e., a modification of the flat input keyboard 30 of FIGS. 2A-4), the input regions 56 and the non-input region 58 are provided in the elastic plate-like member 36 as portions having mutually different shapes adapted to exhibit different elastic deformations by an equal pressing force. More specifically, the elastic plate-like member 36 includes a recess 60 formed on the inner surface 52 and provided to each input region 56, and a protrusion 62 formed on the outer surface 54 and provided to each input region 56 correspondingly to the recess 60. Thus, the input region 56 is formed to have a rectangular cap shape bulging out in one direction relative to the non-input region 58.

The flat input keyboard 30 of FIG. 5 includes a printed sheet 68 provided on a side opposite to the input operation surface 32 of the touch panel 34 facing the elastic plate-like member 36. The touch panel 34 and the elastic plate-like member 36 have optical transparency allowing a printed surface 70 of the printed sheet 68 to be visually recognized from the side of the outer surface 54 of the elastic plate-like member 36. Thus, an operator can perform a keying operation to press a desired input region 56 of the elastic plate-like member 36 while referring to a key display shown on the printed surface 70 of the printed sheet 68, which can be visually recognized in the input region 56 of the elastic plate-like member 36. The input region 56 elastically deforms in response to the keying operation by the operator and, when the pressing force of the keying operation exceeds a predetermined threshold value, accomplishes an input operation on the input operation surface 32 of the touch panel 34 at the position corresponding to the pressed or deformed input region 56. In this embodiment, the method for identifying the key subjected to the input operation in the resistive-type touch panel 34 is the same as that described with reference to the embodiments of FIGS. 2A-4.

According to the flat input keyboard 30 of FIG. 5, due to the elastic deformation amount and/or elastic reaction force of the input region 56 and a region adjacent thereto of the elastic plate-like member 36, it is possible to ensure keying operation characteristics that enable an operator to realize and recognize a key entry operation by an operational feeling on a finger. In this connection, in the configuration depicted in FIG. 5, since the protrusion 62 is formed in the input region 56 on the outer surface 54 of the elastic plate-like member 36, the input region 56 can be more easily recognized in visual and tactile sense as the presence of the protrusion 62 on the outer surface 54. Further, since the recess 60 is formed in the input region 56 on the inner surface 52 of the elastic plate-like member 36, the input region 56 is elastically deformed more easily than the non-input region 58 supported on the input operation surface 32 of the touch panel 34, under an equal pressing force. Therefore, the input region 56 permitting the input operation of the touch panel 34 and the non-input region 58 not permitting the input operation of the touch panel 34 can be formed by suitably selecting the size (in particular, the thickness) and the material of the elastic plate-like member 36 in such a manner that the range of the pressing force required to elastically deform the elastic plate-like member 36 to the extent sufficient to carry out the input operation of the touch panel 34 is, in the input region 56, comparable to the range of a pressing force required to a key entry operation generally set in a keyboard having a mechanical key switch (the pressing force in this range is hereinafter referred to as a normal pressing force), while in the non-input region 58, exceeds the normal pressing force (the pressing force in this range is hereinafter referred to as an excessive pressing force).

In the configuration depicted in FIG. 5, an operating stroke defined from a state where an operator brings his finger into contact with the outer surface 54 of the elastic plate-like member 36 (i.e., a top surface of the protrusion 62) to a state where the operator presses to deform the input region 56 so as to complete the input operation, can be appropriately set by suitably selecting the depth of the recess 60 and the height of the protrusion 62 in the input region 56. The recess 60 and the protrusion 62 may be formed in a mold during a molding process of the elastic plate-like member 36 in a case where the elastic plate-like member 36 has a unitary or one-piece structure, or alternatively may be formed when sheet materials of the elastic plate-like member 36 are stacked on each other in a case where the elastic plate-like member 36 has a laminated structure of the sheet materials.

The flat input keyboard 30 of FIG. 5 may have a configuration similar to that of the embodiments of FIGS. 2A-4, wherein the dot spacers 50 of the touch panel 34 are arranged in such a manner that a density of the dot spacers 50 in a region corresponding to the input region 56 is lower than a density of the dot spacers 50 in a region corresponding to the non-input region 58, so that it is possible to effectively prevent the touch panel 34 from being subjected to an input operation at the non-input region 58 even when a pressing force is applied to the non-input region 58. Alternatively, as depicted, the dot spacers 50 may be arranged in a uniform density across the touch panel 34. Further, the input region 56 and the non-input region 58 may have mutually different material properties (density, material, etc.). For example, the input region 56 and the non-input region 58 may be formed by molding the elastic plate like member 36 through a two-color molding process, so as to provide the non-input region 58 with material properties more difficult to be elastically deformed than the input region 56.

Figure 6:
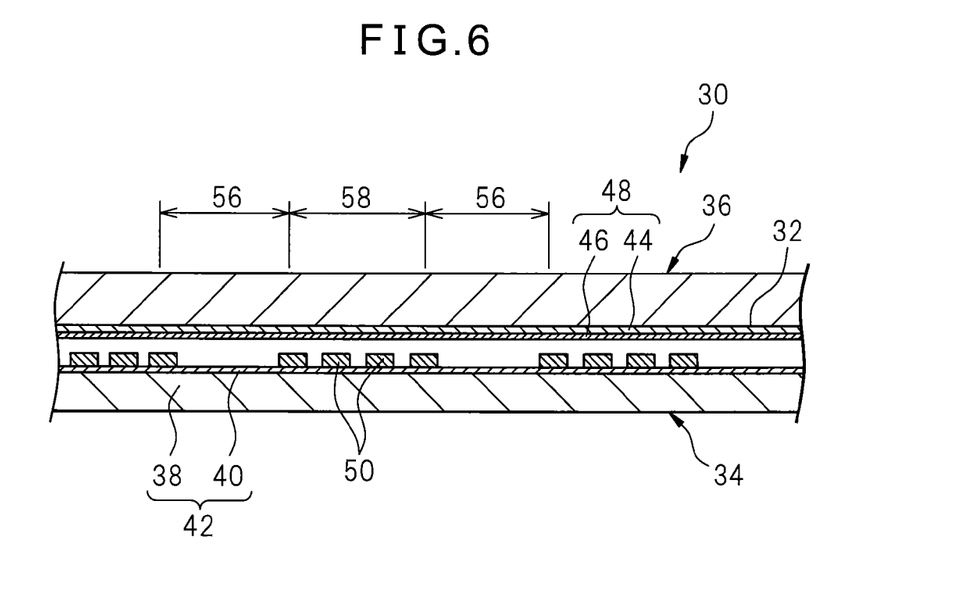
FIG. 6 is a cross-sectional view schematically and diagrammatically depicting a flat input keyboard according to an yet further embodiment of the present invention.

In the flat input keyboard 30 including a resistive-type touch panel 34, as an embodiment depicted in FIG. 6, the input region 56 permitting the input operation of the touch panel 34 and the non-input region 58 not permitting the input operation of the touch panel 34 can also be formed by simply arranging the dot spacers 50 of the touch panel 34 in such a manner that a density of the dot spacers 50 in a region corresponding to the input region 56 is lower than a density of the dot spacers 50 in a region corresponding to the non-input region 58, even when the elastic plate-like member 36 having an entirely uniform configuration (shape, material, etc.) is used. Alternatively, as an embodiment depicted in FIG. 7, the input region 56 permitting the input operation of the touch panel 34 and the non-input region 58 not permitting the input operation of the touch panel 34 can also be formed by simply forming the input region 56 and the non-input region 58 so as to have mutually different material properties (density, material, etc.) by molding the elastic plate-like member 36 through, for example, a two-color molding process, so as to provide the input region 56 with material properties more easy to be elastically deformed than the non-input region 58, even when the dot spacers 50 of the touch panel 34 are arranged in a uniform density across the touch panel 34, or when the elastic plate-like member 36 having an entirely uniform shape (in particular, thickness) is used.

Figure 7:
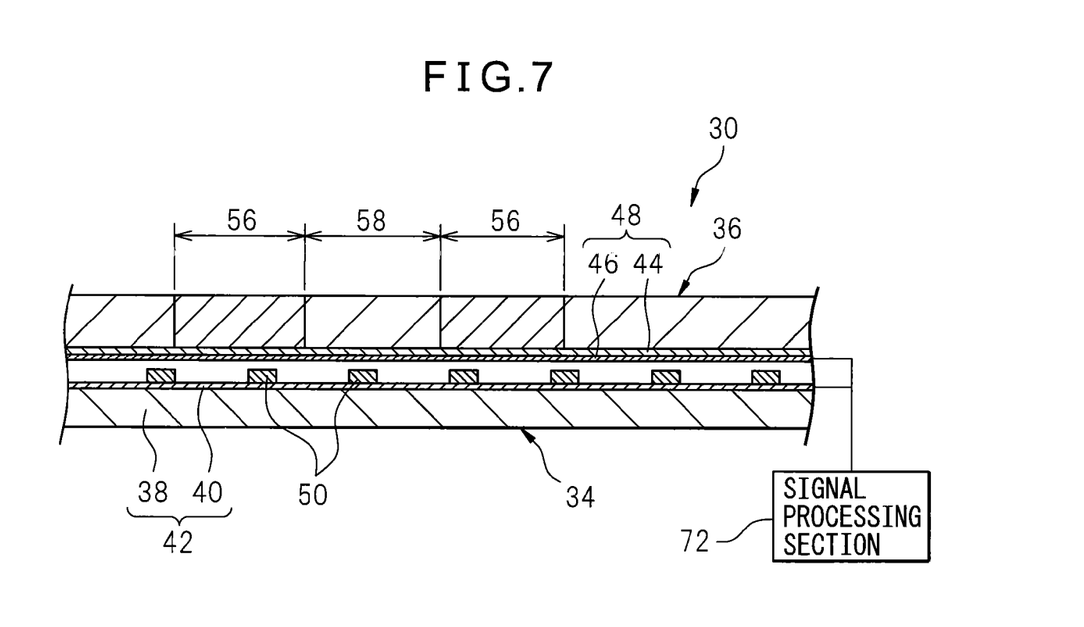
FIG. 7 is a cross-sectional view schematically and diagrammatically depicting a flat input keyboard according to an yet further embodiment of the present invention.

As depicted in FIG. 7, the flat input keyboard 30 may also include a signal processing section 72 adapted to cancel an input signal of the touch panel 34 generated in a region corresponding to the non-input region 58 of the elastic plate-like member 36. The signal processing section 72 operates in accordance with a predetermined processing routine wherein, even if a pressing force is applied to the non-input region 58 and the conductive coatings 40, 46 of the first and second electrode plates 42, 48 of the touch panel 34 locally come into contact with each other by the pressing force applied to the input operation surface 32 via the non-input region 58, an input signal obtained from the local contact between the conductive coatings 40, 46 is cancelled so as not to specify an input position. According to this configuration, it is possible to reliably prevent the non-input region 58 from performing an input operation to the touch panel 34. The signal processing section 72 may be provided in any of the embodiments of FIGS. 2A-6.

A flat input keyboard 80 depicted in each of FIGS. 8A-12 includes a capacitive-type touch panel 84 having an input operation surface 82, and an elastic plate-like member 86 disposed and superimposed on the input operation surface 82 of the touch panel 84, the elastic plate-like member 86 being locally and elastically deformable by a pressing force applied thereto.

Figure 8A:
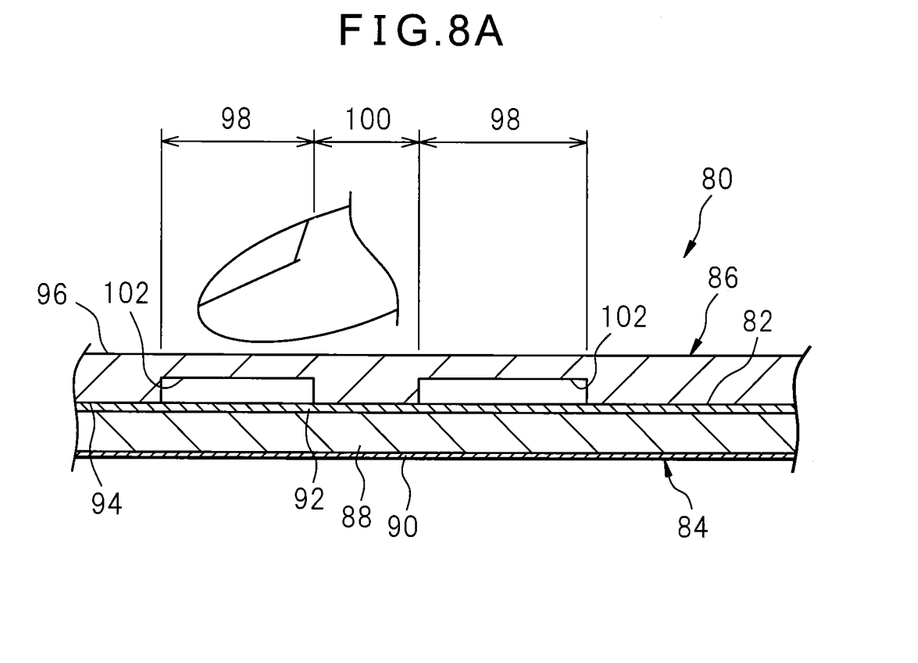
FIG. 8A is a cross-sectional view schematically and diagrammatically depicting a flat input keyboard according to an yet further embodiment of the present invention, in a state before being subjected to an input operation.
Figure 8B:
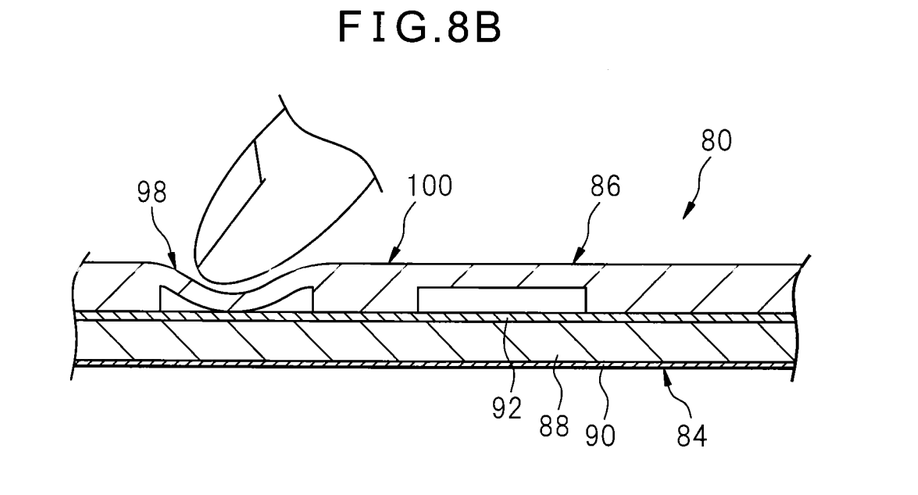
FIG. 8B is a cross-sectional view schematically and diagrammatically depicting the flat input keyboard of FIG. 8A, in a state during the input operation.

The capacitive-type touch panel 84 includes an electrically insulating substrate 88, and a pair of electrically conductive coats or coatings 90, 92 provided on opposite sides of the substrate 88, each conductive coating 90, 92 being divided into a plurality of strip parts (not depicted), wherein the strip parts of the conductive coating 90 are arranged so as to extend perpendicularly to the strip parts of the conductive coating 92. In the illustrated configuration, one conductive coating 92 (on the upper side in the drawing) is disposed at an input side, and the surface of the substrate 88 with the conductive coating 92 provided thereon constitutes an input operation surface 82. The substrate 88 is made of, for example, a glass plate, a plastic plate, etc.

A predetermined electric voltage is applied to a plurality of strip parts of respective conductive coatings 90, 92, and when an operator brings his finger close to or into contact with a desired point on the input operation surface 82 (i.e., when the operator performs a touch input), electric currents flowing in the strip parts of the respective conductive coatings 90, 92 change as a function of a distance from the touched point, and a two-dimensional coordinate value of the touched point is detected based on the magnitude of the current change in each strip part. The above-described method for detecting an input coordinate value has been known as a projected capacitive technology. The touch panel 84 may include a capacitive-type touch panel having the other configuration, such as a capacitive-type touch panel using a projected capacitive technology in which a pair of conductive coatings each divided into a plurality of strip parts are provided on mutually opposed surfaces of two substrates, or a capacitive-type touch panel using a surface capacitive technology in which a conductive coating is provided uniformly across one surface of a single substrate. The configuration of the capacitive-type touch panel is known, and thus is not further explained in detail.

The elastic plate-like member 86 is a flat platy member similar to the elastic plate-like member 16 depicted in FIG. 1, and includes an inner surface 94 facing the input operation surface 82 of the touch panel 84 and an outer surface (i.e., an exposed surface) 96 opposite to the inner surface 94 and not facing the input operation surface 82. The elastic plate-like member 86 is provided with a plurality of input regions 98 and a non-input region 100, corresponding respectively to the input regions 22 and the non-input region 24 depicted in FIG. 1.

In the embodiment depicted in FIGS. 8A-8B, the input regions 98 and the non-input region 100 are provided in the elastic plate-like member 86 as portions having mutually different shapes adapted to exhibit different elastic deformations by an equal pressing force. More specifically, each of the input regions 98 has a thickness less than a thickness of the non-input region 100, and the elastic plate-like member 86 includes a recess 102 formed on the inner surface 94 and provided to each input region 98 due to a difference in thickness between the input region 98 and the non-input region 100.

In the flat input keyboard 80 of FIGS. 8A-8B, an operator can perform a keying operation to press a desired input region 98 of the elastic plate-like member 36 while referring to a key display (not depicted), such as a character, a number, a symbol, etc., indicated on the input region 98 (FIG. 8A). The key display on each input region 98 can be indicated by, e.g., a screen display on a display unit (not depicted) provided on a side opposite to the input operation surface 82 of the touch panel 84 facing the elastic plate-like member 86, a print display on the input operation surface 82 of the touch panel 84, a print display on the elastic plate-like member 86, an insertion of a printed sheet (not depicted), and so on.

The input region 98 elastically deforms in response to the keying operation by the operator and, when the pressing force of the keying operation exceeds a predetermined threshold value, accomplishes an input operation on the input operation surface 82 of the touch panel 84 at a position corresponding to the pressed or deformed input region 98 (FIG. 8B). In the capacitive-type touch panel 84, electric currents flowing in the aforementioned strip parts of the respective conductive coatings 90, 92 change as a function of a change in distance between the finger pressing the input region 98 of the elastic plate-like member 86 and the conductive coatings 90, 92 (i.e., a change in electrostatic capacitance). When the current change in each conductive coating 90, 92 exceeds a predetermined threshold value, a signal processing section (not depicted) of the touch panel 84 specifies a two-dimensional coordinate value of the position of the pressed point by the aforementioned method, and thereby identifies the key (i.e., the input region 98) subjected to the input operation.

According to the flat input keyboard 80 of FIGS. 8A-8B, due to the elastic deformation amount and/or elastic reaction force of the input region 86 and a region adjacent thereto of the elastic plate-like member 86, it is possible to ensure keying operation characteristics that enable an operator to realize and recognize a key entry operation by an operational feeling on a finger. In this connection, in the configuration depicted in FIGS. 8A-8B, since the input region 98 is thinner than the non-input region 100 and the recess 102 is formed in the input region 98 on the inner surface 94 of the elastic plate-like member 86, the input region 98 is elastically deformed more easily than the non-input region 100 under an equal pressing force. Therefore, the input region 98 permitting the input operation of the touch panel 84 and the non-input region 100 not permitting the input operation of the touch panel 84 can be formed by suitably selecting the size (in particular, the thickness) and the material of the elastic plate-like member 86 in such a manner that the range of the pressing force required to elastically deform the elastic plate-like member 86 to the extent sufficient to carry out the input operation of the touch panel 84 is, in the input region 98, comparable to the range of a pressing force required to a key entry operation generally set in a keyboard having a mechanical key switch (the pressing force in this range is hereinafter referred to as a normal pressing force), while in the non-input region 100, exceeds the normal pressing force (the pressing force in this range is hereinafter referred to as an excessive pressing force).

In the configuration of FIGS. 8A-8B, an operating stroke defined from a state where an operator brings his finger into contact with the outer surface 96 of the elastic plate-like member 86 to a state where the operator presses to deform the input region 98 so as to complete the input operation, can be appropriately set by suitably selecting the difference in thickness between the input region 98 and the non-input region 100 (i.e., the depth of the recess 102). The recess 102 may be formed in a mold during a molding process of the elastic plate-like member 86 in a case where the elastic plate-like member 86 has a unitary or one-piece structure, or alternatively may be formed when sheet materials of the elastic plate-like member 86 are stacked on each other in a case where the elastic plate-like member 86 has a laminated structure of the sheet materials. Since, in the configuration of FIGS. 8A-8B, the input region 98 of the elastic plate-like member 86 is elastically deformed more easily as compared to the non-input region 100, an operator can judge whether or not the input region 98 is accurately pressed or keyed, based on the operational feeling sensed at the tip of his finger.

In the flat input keyboard 80 of FIGS. 8A-8B, the input region 98 and the non-input region 100 may have mutually different material properties (density, material, etc.). For example, the input region 98 and the non-input region 100 may be formed by molding the elastic plate-like member 86 through a two-color molding process, so as to provide the non-input region 100 with material properties more difficult to be elastically deformed than the input region 98.

In the flat input keyboard 80 of FIGS. 8A-8B, if an air is encapsulated in an air-tight manner in the recess 102 formed on the side of the inner surface 94 of the elastic plate-like member 86, the keying operation characteristics of the input region 98 may be affected by an air spring due to the encapsulated air. From this viewpoint, a passage (not depicted) allowing air to flow between the recess 102 and the exterior of the keyboard 80 may be formed at a required position on the inner surface 94 of the elastic plate-like member 86.

Figure 9:
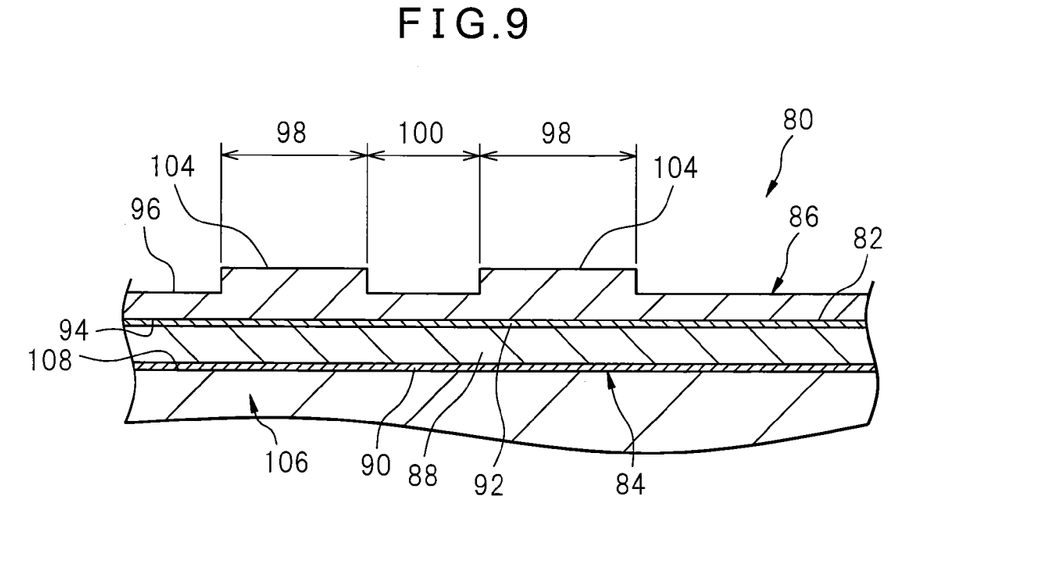
FIG. 9 is a cross-sectional view schematically and diagrammatically depicting a flat input keyboard according to an yet further embodiment of the present invention.

In the embodiment depicted in FIG. 9 (i.e., a modification of the flat input keyboard 80 of FIGS. 8A-8B), the input regions 98 and the non-input region 100 are provided in the elastic plate-like member 86 as portions having mutually different shapes adapted to exhibit different elastic deformations by an equal pressing force. More specifically, each of the input regions 98 has a thickness greater than a thickness of the non-input region 100, and the elastic plate-like member 86 includes a protrusion 104 formed on the outer surface 96 and provided to each input region 98 due to a difference in thickness between the input region 98 and the non-input region 100.

The flat input keyboard 80 of FIG. 9 includes a display unit 106, such as an LCD, provided on a side opposite to the input operation surface 82 of the touch panel 84 facing the elastic plate-like member 86. The touch panel 84 and the elastic plate-like member 86 have optical transparency allowing a screen 108 of the display unit 106 to be visually recognized from the side of the outer surface 96 of the elastic plate-like member 86. Thus, an operator can perform a keying operation to press a desired input region 98 of the elastic plate-like member 86 while referring to a key display shown on the screen 108 of the display unit 106, which can be visually recognized in the input region 98 of the elastic plate-like member 86. The input region 98 elastically deforms in response to the keying operation by the operator and, when the pressing force of the keying operation exceeds a predetermined threshold value, accomplishes an input operation on the input operation surface 82 of the touch panel 84 at a position corresponding to the pressed or deformed input region 98. In the capacitive-type touch panel 84, electric currents flowing in the aforementioned strip parts of the respective conductive coatings 90, 92 change as a function of a change in distance between the finger pressing the input region 98 of the elastic plate-like member 86 and the conductive coatings 90, 92 (i.e., a change in electrostatic capacitance). When the current change in each conductive coating 90, 92 exceeds a predetermined threshold value, a signal processing section of the touch panel 84 specifies a two-dimensional coordinate value of the position of the pressed point by the aforementioned method, and thereby identifies the key (i.e., the input region 98) subjected to the input operation.

According to the flat input keyboard 80 of FIG. 9, due to the elastic deformation amount and/or elastic reaction force of the input region 98 and a region adjacent thereto of the elastic plate-like member 86, it is possible to ensure keying operation characteristics that enable an operator to realize and recognize a key entry operation by an operational feeling on a finger. In this connection, in the configuration depicted in FIG. 9, since the input region 98 is thicker than the non-input region 100, the input region 98 is more difficult to be elastically deformed than the non-input region 100 under an equal pressing force. On the other hand, since the protrusion 104 is formed in the input region 98 on the outer surface 96 of the elastic plate-like member 86, the input region 98 can be more easily recognized in visual and tactile sense as the presence of the protrusion 104 on the outer surface 96. When the keyboard 80 of FIG. 9 is configured in accordance with a key arrangement for a conventional keyboard, the non-input region 100 formed between adjacent input regions 98 has relatively small area as compared to the input region 98, so that an operator can accurately perform a keying operation to the input region 98.

In the flat input keyboard 80 of FIG. 9, the input region 98 and the non-input region 100 may have mutually different material properties (density, material, etc.). For example, the input region 98 permitting the input operation of the touch panel 84 and the non-input region 100 not permitting the input operation of the touch panel 84 may be formed by molding the elastic plate like member 86 through a two-color molding process, so as to provide the non-input region 100 with material properties more difficult to be elastically deformed than the input region 98.

In the configuration of FIG. 9, an operating stroke defined from a state where an operator brings his finger into contact with the outer surface 96 of the elastic plate-like member 86 (i.e., a top surface of the protrusion 104) to a state where the operator presses to deform the input region 98 so as to complete the input operation, can be appropriately set by suitably selecting the difference in thickness between the input region 98 and the non-input region 100 (i.e., the height of the protrusion 104). The protrusion 104 may be formed in a mold during a molding process of the elastic plate-like member 86 in a case where the elastic plate-like member 86 has a unitary or one-piece structure, or alternatively may be formed when sheet materials of the elastic plate-like member 86 are stacked on each other in a case where the elastic plate-like member 86 has a laminated structure of the sheet materials.

Figure 10:
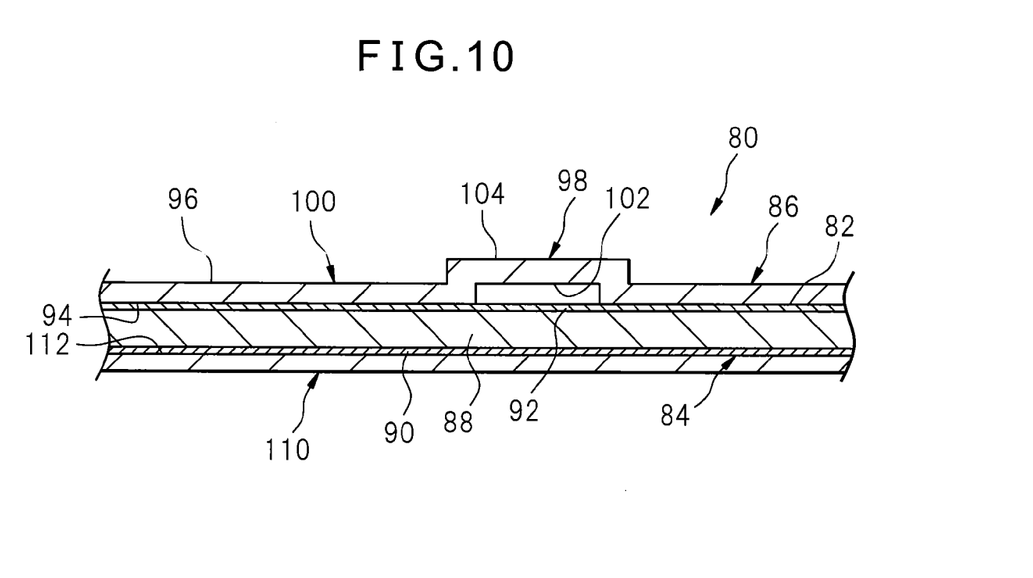
FIG. 10 is a cross-sectional view schematically and diagrammatically depicting a flat input keyboard according to an yet further embodiment of the present invention.

In the embodiment depicted in FIG. 10 (i.e., a modification of the flat input keyboard 80 of FIGS. 8A-9), the input regions 98 and the non-input region 100 are provided in the elastic plate-like member 86 as portions having mutually different shapes adapted to exhibit different elastic deformations by an equal pressing force. More specifically, the elastic plate-like member 86 includes a recess 102 formed on the inner surface 94 and provided to each input region 98, and a protrusion 104 formed on the outer surface 96 and provided to each input region 98 correspondingly to the recess 102. Thus, the input region 98 is formed to have a rectangular cap shape bulging out in one direction relative to the non-input region 100.

The flat input keyboard 80 of FIG. 10 includes a printed sheet 110 provided on a side opposite to the input operation surface 82 of the touch panel 84 facing the elastic plate-like member 86. The touch panel 84 and the elastic plate-like member 86 have optical transparency allowing a printed surface 112 of the printed sheet 110 to be visually recognized from the side of the outer surface 96 of the elastic plate-like member 86. Thus, an operator can perform a keying operation to press a desired input region 98 of the elastic plate-like member 86 while referring to a key display shown on the printed surface 112 of the printed sheet 110, which can be visually recognized in the input region 98 of the elastic plate-like member 86. The input region 98 elastically deforms in response to the keying operation by the operator and, when the pressing force of the keying operation exceeds a predetermined threshold value, accomplishes an input operation on the input operation surface 82 of the touch panel 84 at the position corresponding to the pressed or deformed input region 98. In this embodiment, the method for identifying the key subjected to the input operation in the capacitive-type touch panel 84 is the same as that described with reference to the embodiments of FIGS. 8A-9.

According to the flat input keyboard 80 of FIG. 10, due to the elastic deformation amount and/or elastic reaction force of the input region 98 and a region adjacent thereto of the elastic plate-like member 86, it is possible to ensure keying operation characteristics that enable an operator to realize and recognize a key entry operation by an operational feeling on a finger. In this connection, in the configuration depicted in FIG. 10, since the protrusion 104 is formed in the input region 98 on the outer surface 96 of the elastic plate-like member 86, the input region 98 can be more easily recognized in visual and tactile sense as the presence of the protrusion 104 on the outer surface 96. Further, since the recess 102 is formed in the input region 98 on the inner surface 94 of the elastic plate-like member 86, the input region 98 is elastically deformed more easily than the non-input region 100 supported on the input operation surface 82 of the touch panel 84, under an equal pressing force. Therefore, the input region 98 permitting the input operation of the touch panel 84 and the non-input region 100 not permitting the input operation of the touch panel 84 can be formed by suitably selecting the size (in particular, the thickness) and the material of the elastic plate-like member 86 in such a manner that the range of the pressing force required to elastically deform the elastic plate-like member 86 to the extent sufficient to carry out the input operation of the touch panel 84 is, in the input region, comparable to the range of a pressing force required to a key entry operation generally set in a keyboard having a mechanical key switch (the pressing force in this range is hereinafter referred to as a normal pressing force), while in the non-input region 100, exceeds the normal pressing force (the pressing force in this range is hereinafter referred to as an excessive pressing force).

In the configuration depicted in FIG. 10, an operating stroke defined from a state where an operator brings his finger into contact with the outer surface 96 of the elastic plate-like member 86 (i.e., a top surface of the protrusion 104) to a state where the operator presses to deform the input region 98 so as to complete the input operation, can be appropriately set by suitably selecting the depth of the recess 102 and the height of the protrusion 104 in the input region 98. The recess 102 and the protrusion 104 may be formed in a mold during a molding process of the elastic plate-like member 86 in a case where the elastic plate-like member 86 has a unitary or one-piece structure, or alternatively may be formed when sheet materials of the elastic plate-like member 86 are stacked on each other in a case where the elastic plate-like member 86 has a laminated structure of the sheet materials.

In the flat input keyboard 80 of FIG. 10, the input region 98 and the non-input region 100 may have mutually different material properties (density, material, etc.). For example, the input region 98 permitting the input operation of the touch panel 84 and the non-input region 100 not permitting the input operation of the touch panel 84 may be formed by molding the elastic plate like member 86 through a two-color molding process, so as to provide the non-input region 100 with material properties more difficult to be elastically deformed than the input region 98.

Figure 11:
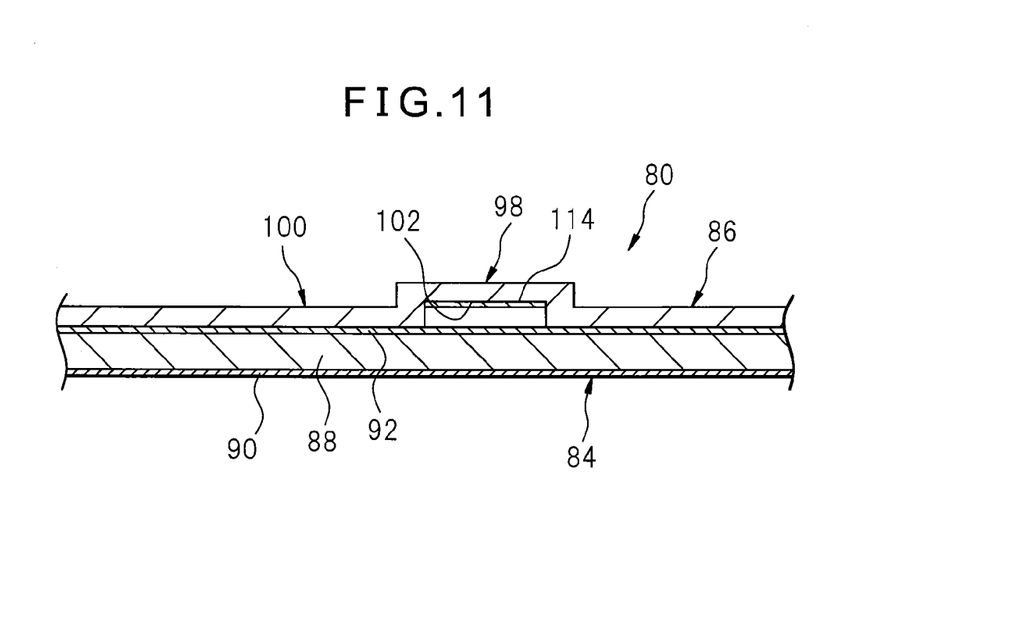
FIG. 11 is a cross-sectional view schematically and diagrammatically depicting a flat input keyboard according to an yet further embodiment of the present invention.

In the flat input keyboard 80 including a capacitive-type touch panel 84, as an embodiment depicted in FIG. 11, the input region 98 of the elastic plate-like member 86 may be provided with an auxiliary conductive coating 114 electrically insulated from the conductive coatings 90, 92 of the touch panel 84. In the illustrated configuration, the auxiliary conductive coating 114 is provided on the bottom face of the recess 102 provided to the input region 98 on the inner surface 94 of the elastic plate-like member 86. When the auxiliary conductive coating 114 is provided in the input region 98, change in electrostatic capacitance between a finger pressing the input region 98 and the conductive coatings 90, 92 is increased as compared to a configuration provided with no auxiliary conductive coating 114, so that the sensitivity of the touch panel 84 is increased and thus the stroke of a keying operation is reduced (i.e., the sensitivity of the flat input keyboard is improved).

Figure 12:
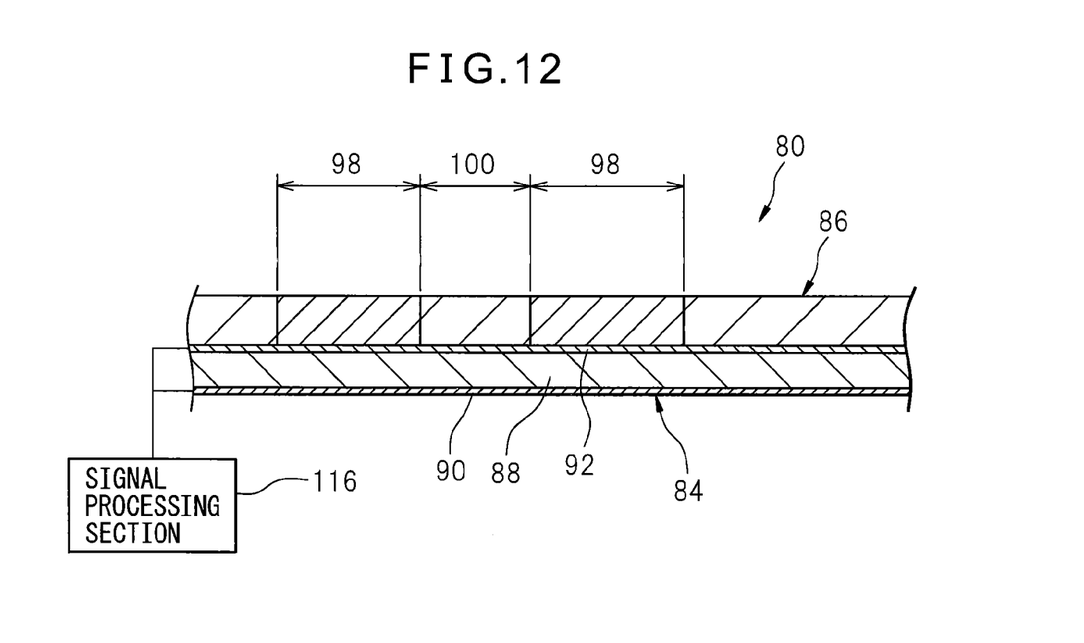
FIG. 12 is a cross-sectional view schematically and diagrammatically depicting a flat input keyboard according to an yet further embodiment of the present invention.

In the flat input keyboard 80 including an capacitive-type touch panel 84, as an embodiment depicted in FIG. 12, the input region 98 permitting the input operation of the touch panel 84 and the non-input region 100 not permitting the input operation of the touch panel 84 can also be formed by simply forming the input region 56 and the non-input region 58 so as to have mutually different material properties (density, material, etc.) by molding the elastic plate-like member 86 through, for example, a two-color molding process, so as to provide the input region 98 with material properties more easy to be elastically deformed than the non-input region 100, even when the elastic plate-like member 86 having an entirely uniform shape (in particular, thickness) is used.

As depicted in FIG. 12, the flat input keyboard 80 may also include a signal processing section 116 adapted to cancel an input signal of the touch panel 84 generated in a region corresponding to the non-input region 100 of the elastic plate-like member 86. The signal processing section 116 operates in accordance with a predetermined processing routine wherein, even if a pressing force is applied to the non-input region 100 due to a keying operation by an operator and a change in electric current flowing each of the conductive coatings 90, 92 caused due to the keying operation exceeds a predetermined threshold value, an input signal obtained from the change in electric current exceeding the threshold value is cancelled so as not to specify an input position. According to this configuration, it is possible to reliably prevent the non-input region 100 from performing an input operation to the touch panel 84. The signal processing section 116 may be provided in any of the embodiments of FIGS. 8A-11.

The present invention is not limited to the configurations depicted above. For example, a keyboard according to an aspect of the present invention may have various key arrangements other than the key arrangement depicted in the drawings. For example, a keyboard according to an aspect of the present invention may be embodied as various input devices provided with a switch subjected to a keying or pressing operation, such as a remote control unit usable for an audio-visual apparatus or other home appliances.

While the invention has been described with reference to specific embodiments, it will be understood by those skilled in the art that various changes and modifications may be made thereto without departing from the scope of the following claims.

The invention claimed is:

1. A keyboard comprising:
  a touch panel, including
    first and second electrode plates separated by a plurality of dot spacers, each electrode plate including a substrate and a conductive coating provided on a surface of the substrate with the conductive coating of the first electrode plate facing the conductive coating of the second electrode plate,
    an input region capable of accepting input operation of said touch panel, and
    a non-input region that does not accept input operation of said touch panel, a first density of the dot spacers arranged in the non-input region being higher than a second density of the dot spacers arranged in the input region; and
  an elastic plate-like member, disposed on said touch panel, having a substantially flat outer surface and including first and second portions corresponding to and extending across said input region and said non-input region, respectively, the first portion having an entirely uniform first thickness less than a second thickness of the second portion.

2. The keyboard of claim 1, wherein a recess is formed on an inner surface of the elastic plate-like member facing said touch panel so as to correspond to the first portion, said recess being provided correspondingly to said input region due to a difference in thickness between the first portion and the second portion.

3. The keyboard of claim 1, wherein said input region and said non-input region comprise mutually different material properties.

4. The keyboard of claim 1, wherein said touch panel comprises a pair of electrode plates each including a substrate and a conductive coating provided on a surface of the substrate, the pair of electrode plates being combined with each other in a relative arrangement such that conductive coatings are opposed to and spaced from each other while permitting a conductive contact between the conductive coatings, and wherein the keyboard further comprises a signal processing section adapted to cancel an input signal of said touch panel in a region corresponding to said non-input region of said elastic plate-like member.

5. The keyboard of claim 1, wherein said touch panel comprises a single conductive coating or a pair of conductive coatings arranged to be opposed to and insulated from each other, and wherein the keyboard further comprises a signal processing section adapted to cancel an input signal of said touch panel in a region corresponding to said non-input region of said elastic plate-like member.

6. The keyboard of claim 5, wherein said input region of said elastic plate-like member is provided with an auxiliary conductive coating insulated from said conductive coatings of said touch panel.

7. The keyboard of claim 1,
  wherein the elastic plate-like member is elastically deformable by a pressing force, and wherein first elastic characteristics of the first portion of the elastic plate-like member differ from second elastic characteristics of the second portion of the elastic plate-like member.

8. The keyboard of claim 1, further comprising a display unit on which the touch panel is arranged, the display unit displaying on the input region a key display including at least one of a character, a number and a symbol.

9. The keyboard of claim 1, wherein no dot spacer is located in the input region.

10. The keyboard of clam 1, wherein high-density dot spacers arranged in the non-input region partially extend into the input region.

11. The keyboard of claim 1, wherein said elastic plate-like member has an uneven inner surface extending across the first and second portions.

12. A keyboard comprising:
a touch panel, including
first and second electrode plates separated by a plurality of dot spacers, each electrode plate including a substrate and a conductive coating provided on a surface of the substrate with the conductive coating of the first electrode plate facing the conductive coating of the second electrode plate,
an input region capable of accepting input operation of said touch panel, and
a non-input region that does not accept input operation of said touch panel, a first density of the dot spacers arranged in the non-input region being higher than a second density of the dot spacers arranged in the input region; and
an elastic plate-like member, disposed on said touch panel, having a substantially flat outer surface and including first and second portions corresponding to and extending across said input region and said non-input region, respectively, the first and second portions differing in thickness, the first portion being spaced from a surface of the touch panel and responding to pressure on the first portion by contacting the surface of the touch panel.

\* \* \* \* \*